(12) United States Patent
Anderle et al.

(10) Patent No.: US 10,240,398 B2
(45) Date of Patent: Mar. 26, 2019

(54) THERMALLY STABLE POLYCRYSTALLINE DIAMOND WITH ENHANCED ATTACHMENT JOINT

(71) Applicant: Halliburton Energy Services, Inc., Houston, TX (US)

(72) Inventors: Seth Garrett Anderle, Spring, TX (US); Cody William Knuteson, Salem, UT (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/038,718

(22) PCT Filed: Dec. 23, 2013

(86) PCT No.: PCT/US2013/077438
§ 371 (c)(1),
(2) Date: May 23, 2016

(87) PCT Pub. No.: WO2015/099653
PCT Pub. Date: Jul. 2, 2015

(65) Prior Publication Data
US 2016/0312540 A1    Oct. 27, 2016

(51) Int. Cl.
*E21B 10/55*    (2006.01)
*C04B 37/02*    (2006.01)
(Continued)

(52) U.S. Cl.
CPC ............ *E21B 10/55* (2013.01); *B23K 1/0008* (2013.01); *B23K 1/19* (2013.01); *B23K 35/36* (2013.01);
(Continued)

(58) Field of Classification Search
None
See application file for complete search history.

(56) References Cited

U.S. PATENT DOCUMENTS 4,850,523 A * 7/1989 Slutz ..................... C04B 37/006
51/295
4,919,220 A * 4/1990 Fuller ................... E21B 10/567
175/433
(Continued)

FOREIGN PATENT DOCUMENTS

WO    2013-169663    11/2013

OTHER PUBLICATIONS https://www.sandvik.coromant.com/en-gb/knowledge/materials/workpiece_materials/iso_p_steel (Jun. 13, 2018).*
(Continued)

*Primary Examiner* — Colleen P Dunn
*Assistant Examiner* — Ross J Christie
(74) *Attorney, Agent, or Firm* — Baker Botts L.L.P.

(57) ABSTRACT

The present disclosure relates to an industrial device, such as a drill bit including a thermally stable polycrystalline diamond (TSP) table coupled to a substrate via an attachment joint, with at least one attachment material located in the attachment joint. At least one of the attachment materials includes a metal or metal alloy and an additive material having a hardness higher than the metal or metal alloy or a coefficient of thermal expansion lower than that of the metal or metal alloy.

20 Claims, 2 Drawing Sheets

(51) Int. Cl.
  *B23K 35/36* (2006.01)
  *B23K 1/19* (2006.01)
  *B23K 1/00* (2006.01)
  *E21B 10/567* (2006.01)
  *B23K 101/00* (2006.01)

(52) U.S. Cl.
  CPC .......... *C04B 37/026* (2013.01); *E21B 10/567* (2013.01); *B23K 2101/002* (2018.08); *C04B 2235/9607* (2013.01); *C04B 2237/125* (2013.01); *C04B 2237/127* (2013.01); *C04B 2237/363* (2013.01); *C04B 2237/60* (2013.01); *C04B 2237/72* (2013.01)

(56) References Cited

U.S. PATENT DOCUMENTS

| | | | |
|---|---|---|---|
| 4,968,326 A * | 11/1990 | Wiand | B24D 3/06 |
| | | | 51/293 |
| 6,054,693 A | 4/2000 | Barmatz et al. | |
| 7,261,753 B2 | 8/2007 | Yamamoto et al. | |
| 7,487,849 B2 | 2/2009 | Radtke | |
| 8,061,454 B2 * | 11/2011 | Voronin | B22F 7/062 |
| | | | 175/426 |
| 8,261,858 B1 | 9/2012 | Atkins et al. | |
| 2006/0254830 A1 * | 11/2006 | Radtke | E21B 10/5735 |
| | | | 175/426 |
| 2008/0085407 A1 * | 4/2008 | Cooley | B24D 3/10 |
| | | | 428/336 |
| 2010/0206941 A1 * | 8/2010 | Egan | C09K 3/1445 |
| | | | 51/295 |
| 2010/0300767 A1 | 12/2010 | Cariveau et al. | |
| 2010/0314176 A1 * | 12/2010 | Zhang | E21B 10/573 |
| | | | 175/383 |
| 2011/0031031 A1 | 2/2011 | Vempati et al. | |
| 2012/0121846 A1 * | 5/2012 | Russell | B23K 1/008 |
| | | | 428/67 |
| 2013/0022836 A1 * | 1/2013 | Easley | C04B 37/006 |
| | | | 428/622 |

OTHER PUBLICATIONS

International Search Report and Written Opinion, Application No. PCT/US2013/077438; 15 pgs, dated Sep. 22, 2014.
International Preliminary Report on Patentability received for PCT Patent Application No. PCT/US2013/077438, dated Jul. 7, 2016; 12 pages.
Office Action received for Canadian Patent Application No. 2931175, dated Mar. 24, 2017; 3 pages.
Office Action received for Canadian Patent Application No. 2931175, dated Dec. 11, 2017; 3 pages.
Office Action received for Chinese Patent Application No. 20130080792, dated Sep. 1, 2017; 12 pages.

* cited by examiner

THERMALLY STABLE POLYCRYSTALLINE DIAMOND WITH ENHANCED ATTACHMENT JOINT

RELATED APPLICATIONS

This application is a U.S. National Stage Application of International Application No. PCT/US2013/077438 filed Dec. 23,2013, which designates the United States, and which is incorporated herein by reference in its entirety.

TECHNICAL FIELD

The current disclosure relates to a thermally stable polycrystalline diamond (TSP) body having an attachment region for attachment of the TSP body to an attachment material at an attachment joint, and industrial devices, such as earth-boring drill bits having a TSP element having an improved performance of the attachment joint.

BACKGROUND

Components of various industrial devices are often subjected to extreme conditions, such as high-temperatures and high-impact contact with hard and/or abrasive surfaces. For example, extreme temperatures and pressures are commonly encountered during earth drilling for oil extraction or mining purposes. Diamond, with its unsurpassed mechanical properties, can be the most effective material when properly used in a cutting element or abrasion-resistant contact element for use in earth drilling. Diamond is exceptionally hard, conducts heat away from the point of contact with the abrasive surface, and may provide other benefits in such conditions.

Diamond in a polycrystalline form has added toughness as compared to single-crystal diamond due to the random distribution of the diamond crystals, which avoids the particular planes of cleavage found in single-crystal diamond. Therefore, polycrystalline diamond (PCD) is frequently the preferred form of diamond in many drilling applications. A drill bit cutting element that utilizes PCD is commonly referred to as a polycrystalline diamond cutter (PDC). Accordingly, a drill bit incorporating PCD cutting elements may be referred to as a PDC bit.

PCD elements can be manufactured in a press by subjecting small grains of diamond and other starting materials to ultrahigh pressure and temperature conditions. One PCD manufacturing process involves forming a PCD table directly onto a substrate, such as a tungsten carbide substrate. The process involves placing a substrate, along with loose diamond grains mixed with a catalyst, into a container of a press, and subjecting the contents of the press to a high-temperature, high-pressure (HTHP) press cycle. The high temperature and pressure cause the small diamond grains to form into an integral PCD table intimately bonded to the substrate. A PCD table thus formed may then be leached to remove the catalyst binder from all or part of the PCD. Leaching out large portions of the catalyst results in a thermally stable polycrystalline diamond (TSP) table. At a certain temperature, typically at least 750° C. at normal atmospheric pressure, the TSP will not crack or graphitize. The TSP may then be reattached to a new substrate (the original one on which the PCD was formed typically being destroyed in the leaching process) to form a TSP element, which may then be further attached to a drill bit or other industrial device.

BRIEF DESCRIPTION OF THE DRAWINGS

A more complete understanding of the present embodiments and advantages thereof may be acquired by referring to the following description taken in conjunction with the accompanying drawings, which show particular embodiments of the current disclosure, in which like numbers refer to similar components, and in which.

DETAILED DESCRIPTION

Figure 1:
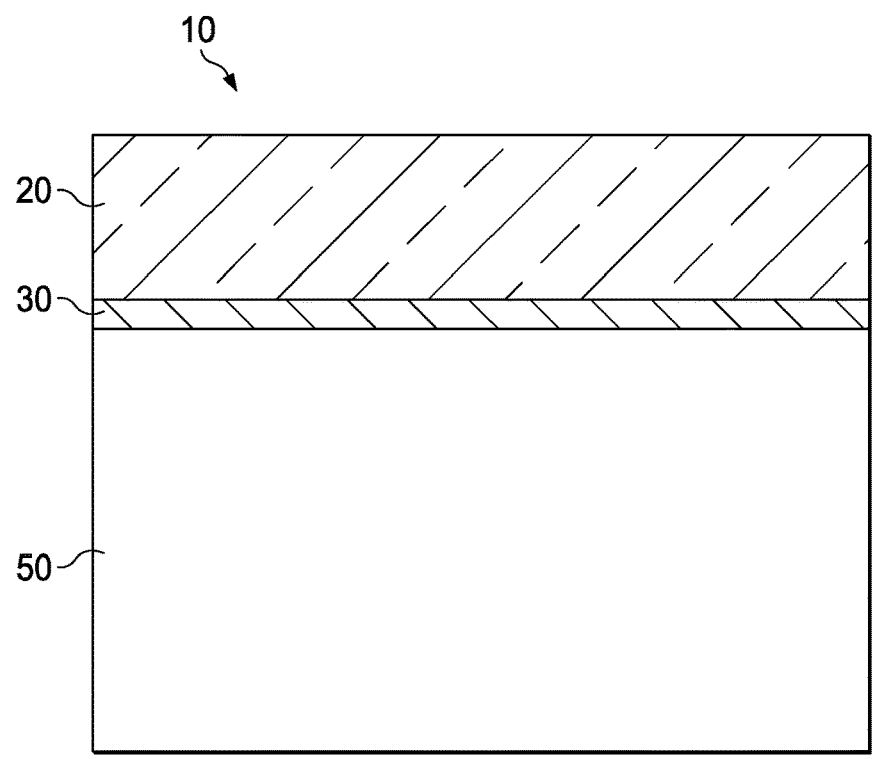
FIG. 1 is a not-to-scale cross-section view of a first embodiment of a TSP element with an improved attachment joint.

The present disclosure relates to an attachment joint for attachment of a TSP table to a substrate to form a TSP element. It also relates to a TSP element, such as TSP cutter containing such an attachment joint as well as an industrial device, such as an earth-boring drill bit, containing such a TSP element.

In order to make PCD more thermally stable, a designer of a drill bit may leach out some of the catalyst (e.g. a material containing a Group VIII metal, such as cobalt) used in the formation of the PCD. If the entire PCD table or substantially all of it has been leached, the table may then be a TSP table. A TSP table may include some residual catalyst, but in some embodiments it contains no more than 70% of the catalyst originally found in the PCD table. In another embodiment, the TSP may be thermally stable at temperatures of at least 750° C., or even 900° C. at atmospheric pressure.

The TSP table may, however, be difficult to attach to other materials, such as a substrate or the bit body of an earth-boring drill bit. For example, poor wetting may interfere with attachment using traditional brazing processes. Additionally, because of the low coefficient of thermal expansion of diamond as compared to most brazing materials, substrates, and bit body materials, even after attachment the joint may fail due to stresses from different rates of thermal expansion. Furthermore, the attachment joint may fail if it is not sufficiently strong, not sufficiently erosion resistant, and not sufficiently stiff enough due to extreme loading and temperature conditions encountered during use, such as downhole when the TSP element is located in a earth-boring drill bit.

The current disclosure relates to an attachment joint containing material having a low coefficient of thermal expansion (CTE) in order to control residual stresses from differing CTEs between the TSP and the substrate. The attachment joint may also preserve or exhibit improvements in joint strength, stiffness and may further exhibit improved erosion resistance. Although braze alloys are used to illustrate the improved attachment joint herein, similar improvements may be achieved by applying similar principles and materials to welding or soldering materials used in an attachment joint.

According to one embodiment of the disclosure, the attachment joint may be a braze joint and may include an active braze alloy. An active braze alloy may be one that readily forms a carbide in the presence of carbon. Such an alloy may exhibit improved abilities to overcome the low wettability of diamond in the TSP table and to otherwise facilitate bonding of the brazing material to the TSP as compared to non-active braze alloys.

Components of the active braze alloy may react with carbon on at least one surface of a TSP table to form a layer of carbide which may then be brazed with a different braze alloy, such as a non-active or more common braze alloy. Active braze alloys may include alloys that include elements such as titanium, vanadium, chromium, and manganese. More common, non-active braze alloys may include elements such silver, copper, nickel, gold, zinc, cobalt, iron, or palladium. In order to effectively bond the TSP body to the substrate, the attachment process typically takes place at an appropriate temperature. For example, with brazing, the braze process typically occurs at temperatures below 1,100-1,200° C., the graphitization point of TSP under controlled atmospheres. The braze process also typically occurs at a temperature at which the braze alloy is sufficiently molten and, in the case of active braze alloys, at which reaction with carbon on the surface of the TSP table may occur.

The current disclosure further relates to managing the residual stresses in the attachment joint due to differences in CTEs. For example, the diamond table and the carbide formed by the active braze may expand at different rates. As an additional example, thermal expansion rates may differ between the TSP body and the attachment material, as well as between the attachment material and the carbide. These three different materials, expanding at different rates, may create high stress on the surface of the TSP body bonded to the substrate, as well as the attachment joint itself. The current disclosure relates to managing differing CTE-related stresses by modifying the CTE of the attachment joint. In many situations, a composite CTE value may be calculated for a given composition of alloys. Often, the calculation may be done by using the rule of mixtures. By adding a material with low CTE to a braze alloy with relatively high CTE, the CTE value of the composite may be reduced. TABLE 1 below provides a listing of typical linear CTE values for TSP, tungsten carbide (a typical substrate used to form a TSP element), and some example braze alloys.

TABLE 1

| Material | CTE |
| --- | --- |
| Thermally stable polycrystalline diamond | $1.0 \times 10^{-6}/° C.$ |
| Tungsten Carbide | $3.5 \times 10^{-6}/° C.$ |
| Tungsten | $4.5 \times 10^{-6}/° C.$ |
| Cemented Tungsten Carbide | $5.0 \times 10^{-6}/° C.$ |
| Steel | $11 \times 10^{-6}/° C.$ |
| Cobalt | $12 \times 10^{-6}/° C.$ |
| Nickel | $13 \times 10^{-6}/° C.$ |
| Gold | $14 \times 10^{-6}/° C.$ |
| Copper | $17 \times 10^{-6}/° C.$ |
| Silver | $18 \times 10^{-6}/° C.$ |
| Titanium | $8.6 \times 10^{-6}/° C.$ |
| Vanadium | $8.4 \times 10^{-6}/° C.$ |
| Chromium | $4.9 \times 10^{-6}/° C.$ |

In some embodiments, an attachment material (e.g., a braze alloy) may include an additive material with a low CTE, such as tungsten, tungsten carbide, diamond grit, steel, or another material with a CTE lower than the CTE of the metal or metal alloy. In the case of a braze alloy, such additive materials may be added to a braze paste or powder prior to brazing. Such additive materials may be added to either an active braze alloy, another braze alloy, or both. Such additive materials may further increase hardness or toughness of the attachment independently of any effects on CTE or other effects. As compared to other attachment materials and also independent of any effects on CTE or other effects alloys, an attachment joint containing a these additive materials may exhibit increased shear strength, increased maximum temperature joint can withstand, increased abrasion resistance, or increased stiffness, causing the diamond table to be more resistant to fracture under heavy loading.

During attachment, the attachment material may melt, cementing the additive material and forming the attachment joint between the TSP table and the substrate. For example, if a silver braze alloy powder and tungsten powder are combined prior to brazing, the overall CTE of the attachment joint maybe reduced from $18 \times 10^{-6}/° C.$ to $10 \times 10^{-6}/° C.$ if they are mixed at a 40/60 ratio (a reduction of 44%), as described below in FORMULA 1.

$$(0.40*18 \times 10^{-6}/° C.)+(0.60*4.5 \times 10^{-6}/° C.)=10 \times 10^{-6}/° C. \quad \text{FORMULA 1}$$

One embodiment of an attachment joint is shown in FIG. 1. TSP element 10 includes TSP table 20 coupled to substrate 50 at attachment joint 30. Attachment joint 30 may be filled with one or more attachment materials coupling TSP body 20 to substrate 50. At least one attachment material may include a composite material as described herein. For example, TSP body 20 may be coupled to substrate 50 by a brazing material composed of at least one of a plurality of metals and at least one additive material, as described in more detail herein. The attachment material may include a brazing alloy, including, but not limited to, an active brazing alloy.

The composite attachment material may be used to form an attachment joint 30 with greater resistance to stresses resulting from differing thermal expansion as well as other advantages as described in more detail herein.

In some embodiments, attachment joint 30 may include a primary attachment layer 35 and a secondary attachment layer 40. In the embodiment shown in FIG. 2, TSP table 20 is coupled to substrate 50 via attachment joint 30 including primary attachment layer 35 and secondary attachment layer 40. Primary attachment layer 35 may be include an active braze alloy to facilitate attachment to TSP table 20. Secondary attachment layer 40 may include a non-active braze alloy and may facilitate attachment of primary attachment layer 35 to substrate 50. As described above with reference to FIG. 1, at least one of the attachment materials used within attachment joint 30 may include a composite attachment material.

A composite attachment material may improve attachment joint 30 in a variety of ways. For example, when attachment joint 30 begins to erode, a gap may form between TSP table 20 and substrate 50. Because diamond is relatively brittle, it benefits from support to prevent flexing or fracturing of the TSP table under heavy loading. Adding harder materials (e.g., tungsten, tungsten carbide, diamond grit, etc.) to the attachment material may increase erosion resistance and minimize loss of support.

The brittleness of diamond also affects the desired stiffness of attachment joint 30. Relatively minor deflection (e.g., less than 0.001 inches) under load may cause the diamond to fracture at the interface with attachment joint 30. Attachment joint 30 may deflect due to compression (e.g., elastic deflection) under heavy loading or compression as the joint loses its mechanical properties under elevated temperature. Adding harder materials (e.g., tungsten, tungsten carbide, diamond grit, etc.) to the attachment material may increase the modulus of elasticity of attachment joint 30, increasing stiffness and minimizing deflection. Thus, resistance of the TSP element to TSP table fracture may be increased in this manner as well.

Figure 2:
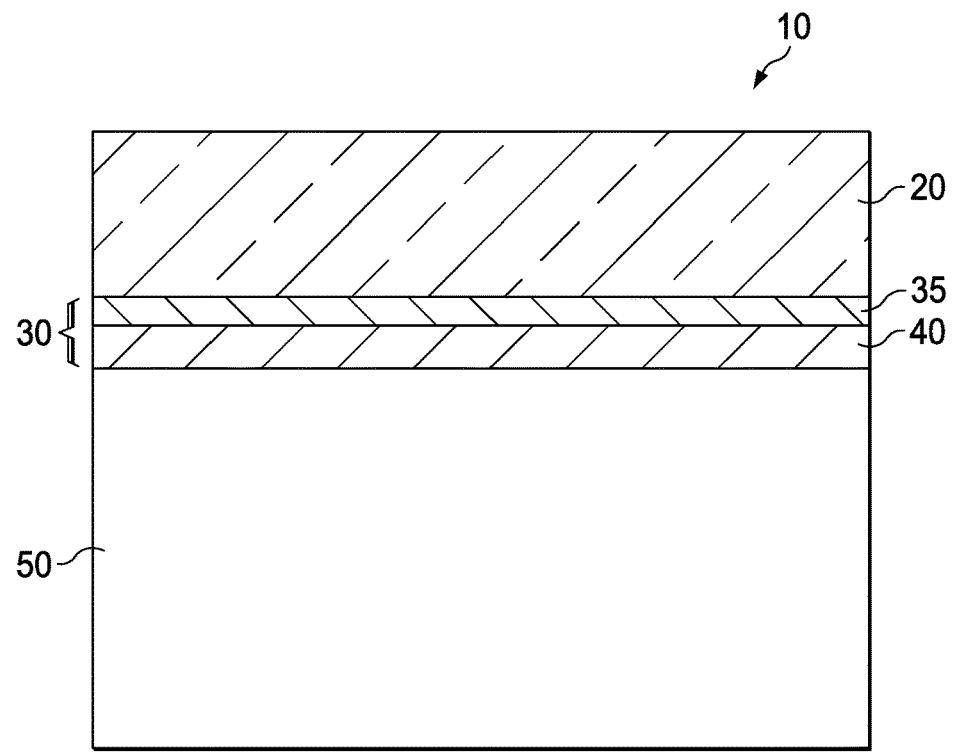
FIG. 2 is a not-to-scale cross-section view of a second embodiment of a TSP element with an improved attachment joint.
Figure 3:
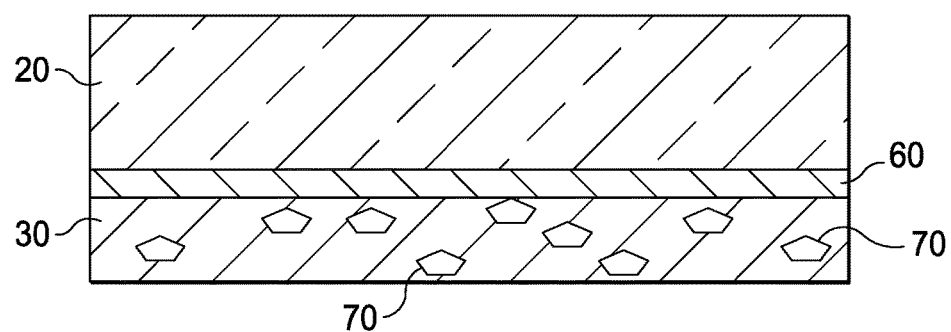
FIG. 3 is a not-to-scale cross-section enlarged view of an embodiment of a TSP element with an improved attachment joint.

An enlarged view of an embodiment using an active braze alloy is provided in FIG. 3. Such an embodiment may employ a single braze alloy 30 as illustrated in FIG. 1, or two braze alloys as illustrated in FIG. 2. In either case, the braze alloy adjacent to the TSP table 20 is an active braze alloy. The active braze alloy, during the process of attaching TSP table 20 to the substrate (not shown in FIG. 3), a forms a carbide layer 60 on the surface of TSP table 20. This carbide layer may facilitate bonding of braze alloy 30 and TSP table 20. Additive material 70, located in braze alloy 30 is also illustrated in FIG. 3. If braze alloy 30 contains primary attachment layer 35 and secondary attachment layer 40, additive material 70 may be present in either or both attachment layers.

Figure 4:
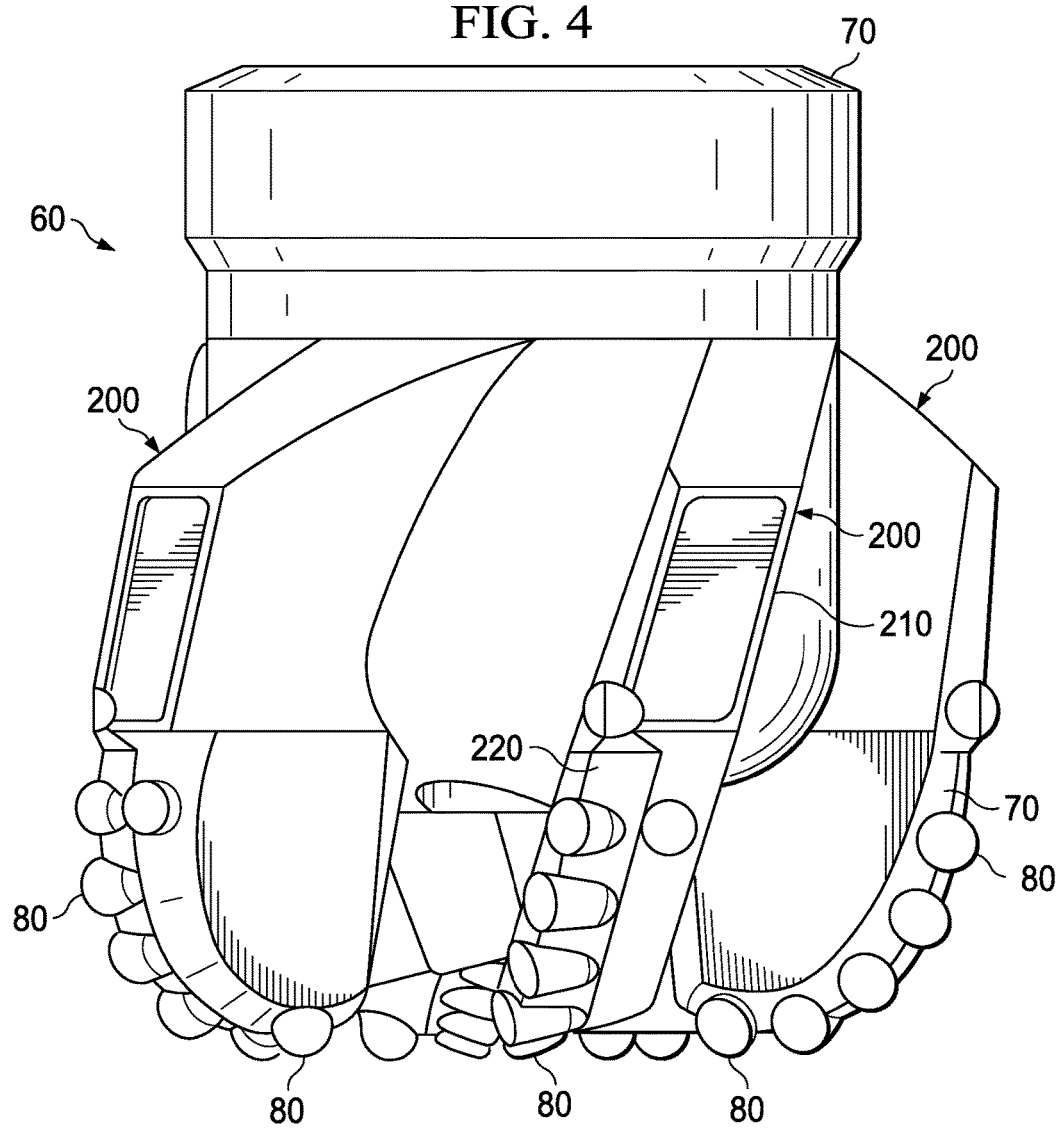
FIG. 4 is an earth-boring drill bit including at least one TSP element in the form of a TSP cutter.

A TSP element containing an attachment joint as described herein may be incorporated into an industrial device, such as an earth-boring drill bit, as illustrated in FIG. 4. FIG. 4 illustrates a fixed cutter drill bit 60 containing a plurality of cutters 80 coupled to drill bit body 70. At least one of cutters 80 may be a TSP element containing an attachment joint as described herein, such as TSP element 10 described in FIGS. 1-3. Fixed cutter drill bit 60 may include bit body 70 with a plurality of blades 200 extending therefrom. Bit body 70 may be formed from steel, a steel alloy, a matrix material, or other suitable bit body material desired strength, toughness and machinability. Bit body 70 may be formed to have desired wear and erosion properties. TSP elements 80 may be mounted on the bit using methods of this disclosure or using other methods. TSP elements may be located in gage region 220, or in a non-gage region, or both.

For the embodiment shown in FIG. 4, fixed cutter drill bit 60 has five (5) blades 200. For some applications the number of blades disposed on a fixed cutter drill bit incorporating teachings of the present disclosure may vary between four (4) and eight (8) blades or more. Respective junk slots 210 may be formed between adjacent blades 200. The number, size and configurations of blades 200 and junk slots 210 may be selected to optimize flow of drilling fluid, formation cutting and downhole debris from the bottom of a wellbore to an associated well surface.

Drilling action associated with drill bit 60 may occur as bit body 70 is rotated relative to the bottom (not expressly shown) of a wellbore in response to rotation of an associated drill string (not expressly shown). At least some cutters 80 disposed on associated blades 200 may contact adjacent portions of a downhole formation (not expressly shown) drilling. These cutters 80 may be oriented such that the TSP table contacts the formation. The inside diameter of an associated wellbore may be generally defined by a combined outside diameter or gage diameter determined at least in part by respective gage portions 220 of blades 200.

TSP elements may also be attached to other portions of drill bit 60 (not expressly shown), such a high-wear areas, including those near nozzles, in junk slots, or in dampening or depth of cut control regions.

Furthermore, in some embodiments, a TSP table may be attached directly to a drill bit 60 without the use of an intervening substrate. In such instances, an attachment joint 30 using an attachment material as described herein may be employed. The location on the bit body at which such a TSP table may be attached may be formed from bit body material or a different material, such as a substrate material pre-set in the bit body.

Although only exemplary embodiments of the invention are specifically described above, it will be appreciated that modifications and variations of these examples are possible without departing from the spirit and intended scope of the invention. For instance, the proper placement and orientation of TSP elements or a TSP table on other industrial devices may be determined by reference to the drill bit example.

The invention claimed is:

1. A thermally stable polycrystalline diamond (TSP) element comprising a TSP table coupled to a substrate at an attachment joint positioned adjacent to the TSP table and adjacent to the substrate, the attachment joint including at least one composite attachment material comprising a metal or metal alloy and further including a steel additive material having a coefficient of thermal expansion (CTE) lower than that of the metal or metal alloy.

2. The TSP element of claim 1, wherein the composite attachment material comprises a braze alloy.

3. The TSP element of claim 2, wherein the braze alloy comprises an active braze alloy.

4. The TSP element of claim 1, further comprising at least one additional attachment material.

5. The TSP element of claim 4, wherein the at least one additional attachment material comprises at least one additional composite attachment material.

6. The TSP element of claim 4, wherein at least one of the composite attachment material and at least one of the additional attachment material both comprise a braze alloy.

7. The TSP element of claim 4, wherein the at least one of the composite attachment material and at least one of the additional attachment material together comprise an active braze alloy positioned adjacent to the TSP table and a non-active braze alloy positioned adjacent to the substrate.

8. The TSP element of claim 1, wherein the additive material further has a hardness greater than that of the metal or metal alloy.

9. The TSP element of claim 1, wherein the TSP element is located in an earth-boring drill bit.

10. A thermally stable polycrystalline diamond (TSP) element comprising a TSP table coupled to a substrate at an attachment joint positioned adjacent to the TSP table and adjacent to the substrate, the attachment joint including at least one composite attachment material including a metal or metal alloy and further including a steel additive material having a hardness greater than that of the metal or metal alloy.

11. The TSP element of claim 10, wherein the composite attachment material comprises a braze alloy.

12. The TSP element of claim 11, wherein the braze alloy comprises an active braze alloy.

13. The TSP element of claim 10, further comprising at least one additional attachment material.

14. The TSP element of claim 13, wherein the at least one additional attachment material comprises at least one additional composite attachment material.

15. The TSP element of claim 13, wherein at least one of the composite attachment material and at least one of the additional attachment material both comprise a braze alloy.

16. The TSP element of claim 13, wherein the at least one of the composite attachment material and at least one of the additional attachment material together comprise an active braze alloy positioned adjacent to the TSP table and a non-active braze alloy positioned adjacent to the substrate.

17. The TSP element of claim 10, wherein the TSP element is located in an earth-boring drill bit.

18. A method of manufacturing a thermally stable polycrystalline diamond (TSP) element comprising forming an attachment joint between a TSP table and a substrate and positioned adjacent to the TSP table and adjacent to the substrate, the attachment joint including at least one composite attachment material comprising an active braze alloy, wherein the attachment joint comprises a carbide layer formed on the surface of the TSP table by the active braze alloy and the at least one composite attachment material comprising a metal or metal alloy and further including a steel additive material having a coefficient of thermal expansion (CTE) lower than that of the metal or metal alloy or an additive material having a hardness greater than that of the metal or metal alloy.

19. The method of claim 18, wherein forming an attachment joint comprises heating the active braze alloy to a temperature at which the active braze alloy reacts with carbon on an adjacent surface of the TSP table.

20. The method of claim 18, further comprising forming the attachment joint via both at least one composite attachment material and at least one additional attachment material.

* * * * *